Patented Oct. 29, 1935

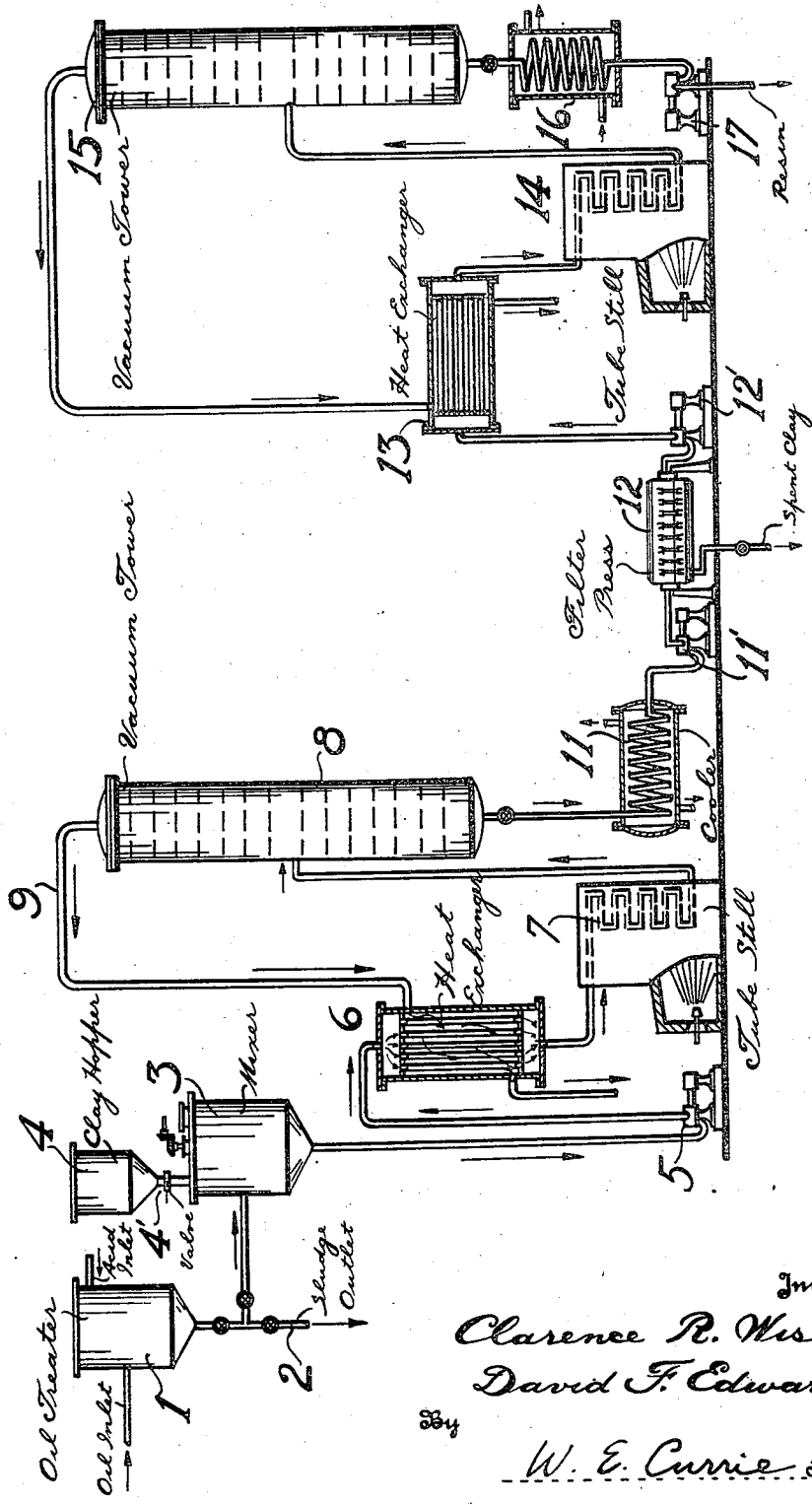

2,018,771

UNITED STATES PATENT OFFICE 2,018,771

PROCESS FOR PREPARING RESINS

Clarence R. Wise, Roselle, and David F. Edwards, Elizabeth, N. J., assignors to Standard Oil Development Company, a corporation of Delaware Application September 18, 1931, Serial No. 563,538

6 Claims. (Cl. 260—2)

The present invention relates to a process for preparing resins from tar, especially from a tar obtained by cracking, and is a further development of the invention disclosed in the co-pending application, Serial No. 529,294, filed on April 10, 1931, by David F. Edwards. It will be fully understood from the following description when read in conjunction with the drawing, the sole figure of which is a diagrammatic side elevation, partly in section, of the apparatus.

The application above referred to disclose a process for preparing an oil with fluorescent properties by treating a tar, especially cracked tar, with sulphuric acid, phosphoric acid, aluminum chloride, zinc chloride, etc., removing the sludge, distilling off part of the treated tar in the presence of a decolorizing clay to remove the light product, and separating the clay from the residual oil. We now have discovered that a resin having fluorescent properties can be prepared from the residual oil by submitting the same to a further distillation step under vacuum.

The tar which may be obtained by cracking petroleum oil, shale oil, a primary tar of the low temperature distillation of coal or crude petroleum pitch is first subjected to treatment with 66° Bé. sulfuric acid after dilution with a lighter hydrocarbon oil to the proper treating viscosity, if required. More concentrated acid and even fuming acid may be used or the acid may be less concentrated. Fifteen pounds of 66° Bé. sulfuric aciu per 42 gallon barrel of tar may be used although the amount of acid used varies greatly with the required color of the final resin. The greater the amount of acid the lighter colored will be the final resin.

The tar is agitated with the sulfuric acid, then allowed to settle and the sludge separated. The resulting acid tar is mixed with a solid adsorbed material such as finely divided fuller's earth, charcoal, bone char, etc. For example, one-quarter pound per gallon of Attapulgus fines may be added and the oil reduced in a shell still with fire and steam to 650 to 700 Saybolt viscosity at 100° F. Instead of using a shell still for the distillation, the same may be carried out also in a pipe still by passing the oil clay slurry through narrow heating coils into a vaporizing tower. The oil clay mixture obtained as bottoms either in the shell still or in the pipe still is cooled somewhat, if necessary, and then filtered to separate the clay. The clay free oil is then charged to a shell still and subjected to further vacuum distillation up to a still temperature of about 650–700° F. at 3–5 mm. of mercury absolute pressure. This vacuum distillation may also be carried out in a vacuum pipe still (40 to 50 mm. pressure) with the aid of steam, at a temperature of about 650° to 700° F. The overhead products may be used as desired and the still bottoms are removed and allowed to solidify to the final resin product. When treating 10–11° gravity tar obtained by cracking West Texas, Colombian and similar oils in the liquid phase, the yield of the final resin products is about 10% based on the original cracked tar.

One modification of the process involves the elimination of sulfuric acid treatment and heating the tar with anhydrous aluminum chloride, zinc chloride or iron chloride. The remaining steps of the treatment are similar to the ones described above. The temperature and duration of heating and the amount of metal chloride used may vary within wide limits. When anhydrous AlCl₃ is the treating agent heating the tar with 2–5% of AlCl₃ at 300–400° F. for 1–2 hours gives good results.

Instead of carrying out the partial distillation of the acid treated tar during the clay treatment a simple filtration through clay at a temperature of say 190° F. may also be used. In this case, however, it is preferable to distill off say 60% of the tar before the acid treatment and use the bottoms of say 600 Saybolt viscosity at 100° F. for the further processing. The amount of acid required is about 25 pounds of 66° sulfuric acid per 42 gallon barrel of bottoms.

The resins obtained by our process have a softening point usually higher than 150° F. as determined by the ball and ring method, have no odor or taste, and are soluble in petroleum naphtha, various esters, and benzol, and insoluble in water, alcohols and acetone. They are unsaponifiable and of hydrocarbon character. When dissolved in small amounts in a pale lubricating oil or one with a bluish fluorescence the resin will impart a desirable greenish fluorescence to the same.

Referring now to the figure, numeral 1 designates a treater in which the cracked tar is treated with sulphuric acid, anhydrous aluminum chloride or other metallic chloride having a polymerizing action similar to that of anhydrous aluminum chloride. The treater may be provided with an agitator, not shown, and the cone-shaped bottom is connected with a draw-off line 2, through which the acid or aluminum chloride sludge is removed after the treatment. 4 designates a clay hopper, and 3 a mixer in which the sludge-free tar is admixed with the clay. The tar-clay slurry is then passed by means of pump 5 through heat exchanger 6 and heated tube 7 into the tower 8, in which the tar is reduced by removing the light ends as overhead distillate through line 9 and heat exchanger 6. The bottoms obtained in tower 8, is pumped by means of pump 11' through cooler 11 and filter press 12. In the latter the clay is removed from the treated tar which is then passed by means of pump 12' through heat exchanger 13 and tube still 14 into the vacuum tower 15 in which the oily products are removed as overhead distillate and condensed in heat exchanger 13, while the molten resin is picked up by pump 17 and passed through cooler 16 into a storage (not shown).

In one case a tar obtained by cracking west Texas gas oil was treated with 15 lbs. of 66° Bé. sulfuric acid per 42 gallon barrel. After settling sixteen hours the oil was separated from the sludge formed during the sulfuric acid treat and mixed with ¼ lb. of Attapulgus fine clay and the mixture of oil and clay charged to a shell still where it was reduced to 55% bottoms by a fire and steam distillation. When the distillation was complete the bottoms containing in suspension the finely divided clay were withdrawn from the still, cooled to about 300° F. and the clay separated by means of a filter press. The clay free oil was then charged to a vacuum still and distilled at 3 mm. absolute pressure and up to a temperature of 650° F. In this way the oily components were removed as overhead products and condensed leaving as bottoms a fluorescent resin which melted at 180° F. When the distillation was complete the still was cooled to about 300° F. and the resin bottoms withdrawn and allowed to cool. The yield of resin having a melting point of 180° F. was about 10% based on the original tar.

In another case the tar was reduced in a shell still with fire and steam to 600 Saybolt viscosity at 100° F. The resin was then treated with 25 lbs. of 66° Bé. sulfuric acid per 42 gallon barrel of reduced tar. After standing sixteen hours the sludge was separated and the sludge-free oil percolated through a bed of coarse Attapulgus clay to reduce the acidity to 0.2 mg. KOH per gram. This treated and filtered tar was then charged to a vacuum still and distilled under an absolute pressure of 3 mm. of mercury and up to a temperature of 650° F. The still was then cooled to about 300° F. and the resin bottoms removed. The yield of resin having a melting point of 180° F. was about 9%.

Our invention is not to be limited by any theory nor the particulars given by way of illustration, but only by the appended claims in which it is our intention to claim all novelty inherent in the process.

We claim:

1. The process of preparing resin from the class of tars consisting of cracked tar and petroleum pitch, which comprises treating said tar with an agent belonging to the class consisting of sulfuric acid, anhydrous aluminum chloride, anhydrous iron chloride and anhydrous zinc chloride, removing the sludge to obtain an acid tar, treating the acid tar with solid adsorbent material, and then subjecting the adsorbent treated tar to distillation under vacuum until a solid resin is obtained as distillation residue.

2. The process of preparing a resin from the class of tars consisting of cracked tar, and petroleum pitch, which comprises diluting the tar with a lighter hydrocarbon oil, treating the diluted mixture with sulfuric acid, removing the sludge to obtain an acid treated mixture, treating the acid treated mixture with a solid adsorbent material, and then subjecting the adsorbent treated mixture to distillation under vacuum to a resinous residue.

3. The process of preparing a resin from a tar obtained by cracking which comprises treating the tar with concentrated sulfuric acid, removing the sludge to obtain an acid tar, treating the acid tar with finely divided decolorizing clay, and then subjecting the clay treated tar to ditsillation under vacuum until a solid resin is obtained as distillation residue.

4. The process of preparing a resin from a cracked tar which comprises treating the tar with concentrated sulfuric acid, removing the sludge to obtain an acid tar, mixing the acid tar with finely divided decolorizing clay and subjecting the tar-clay mixture to distillation, removing the clay from the distillation residue, and subjecting the clay free residue to a distillation under vacuum until a solid resin is obtained as the residue of vacuum distillation.

5. The process of manufacturing resin from a cracked tar, which comprises reducing the tar to about 600 sec. Saybolt viscosity at 100° F., treating the reduced tar with concentrated sulfuric acid, removing the sludge, filtering the sludge-free tar through decolorizing clay, and then subjecting the filtered tar to distillation under vacuum until a solid resin is obtained as residue.

6. The process of preparing resin from cracked petroleum tar, which comprises heating the tar with a substantial portion of an agent belonging to the class consisting of anhydrous aluminum chloride, anhydrous iron chloride, and anhydrous zinc chloride, removing the sludge, filtering the tar through a solid adsorbent material, and then subjecting the tar to distillation under vacuum until a solid resin is obtained as distillation residue.

CLARENCE R. WISE.
DAVID F. EDWARDS.